(No Model.)
T. CLARK.
DEVICE FOR ADVERTISING.
No. 395,953. Patented Jan. 8, 1889.
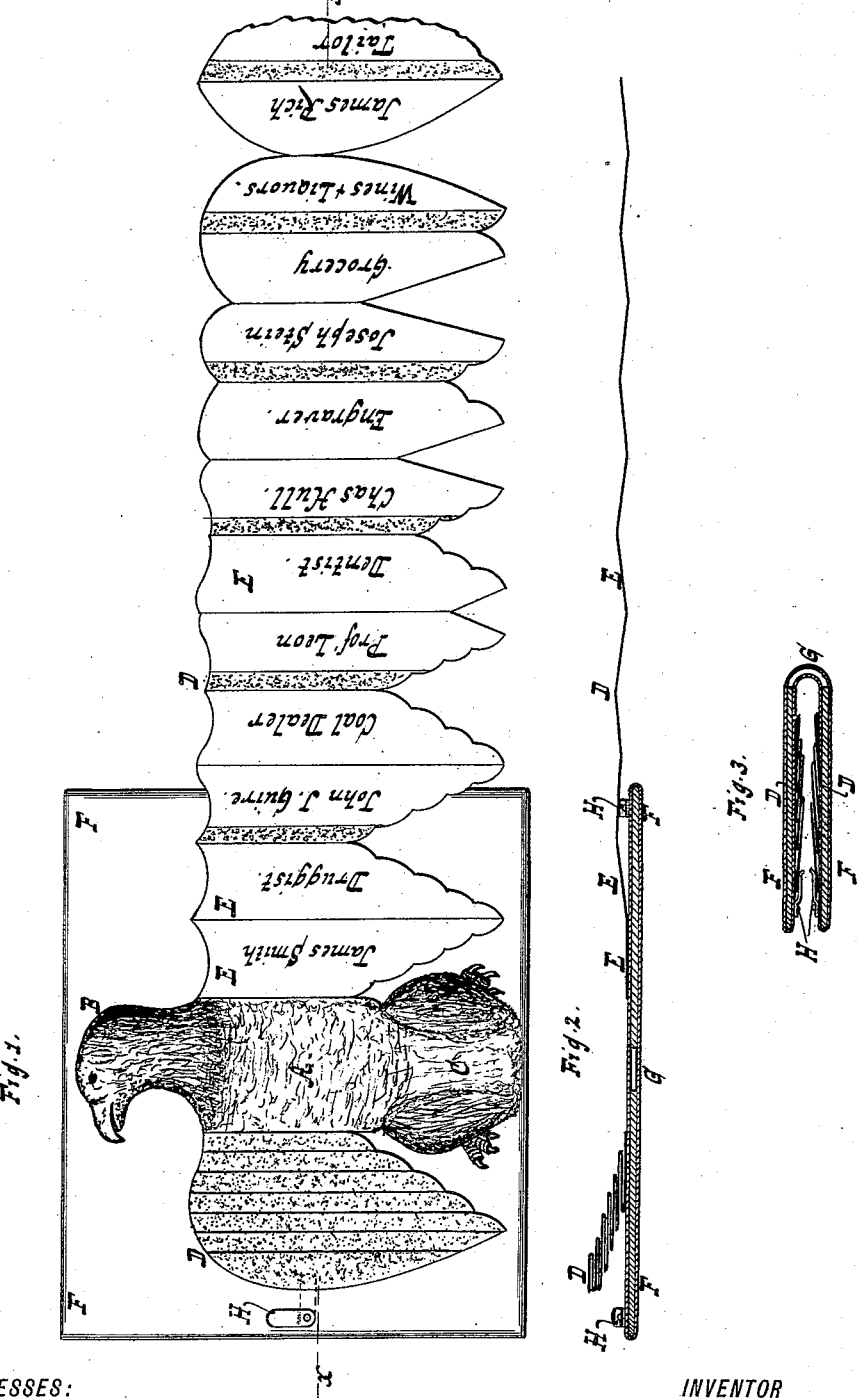
WITNESSES:
William J. Miller
A. Faber du Faur Jr.
INVENTOR
Thomas Clark
BY Van Santvoord & Hauff
his ATTORNEYS

United States Patent Office.

THOMAS CLARK, OF BROOKLYN, NEW YORK, ASSIGNOR TO ANNA JANE CLARK, OF SAME PLACE.

DEVICE FOR ADVERTISING.

SPECIFICATION forming part of Letters Patent No. 395,953, dated January 8, 1889.

Application filed May 3, 1888. Serial No. 272,696. (No model.)

*To all whom it may concern:*

Be it known that I, THOMAS CLARK, a citizen of the United States, residing at Brooklyn, in the county of Kings and State of New York, have invented new and useful Improvements in Devices for Advertising, of which the following is a specification.

This invention relates to a device by which illustrations and advertisements can be conveniently and attractively displayed, as set forth in the following specification and claims, and illustrated in the accompanying drawings, in which—

Figure 1 is a plan view of a device for displaying advertisements. Fig. 2 is a section in the plane $x\,x$, Fig. 1. Fig. 3 is a view similar to Fig. 2, the device being closed.

Similar letters indicate corresponding parts.

In the drawings is shown the representation of a bird, the letter A indicating the body, B the head, and C the tail. The wings D are made in sections to fold and unfold, and the sections are provided with receiving-spaces E. The receiving-spaces serve for the reception of names, addresses, memorandums, or pictures and illustrations of various kinds, according to the nature of the article to be produced, which may be either an advertising device, a pocket-panorama, an almanac, memorandum-book, or other article. When one of the folding and unfolding wings D is extended, as shown in the case of one of the wings in Fig. 1, the receiving-spaces E, together with their contents, are revealed to view. On closing the extensible portion, as seen in the case of the other wing in Fig. 1, the receiving-spaces E are concealed from view and the folded portion presents the appearance of being the bird.

To hold the folding and unfolding wings closed a lock, H, is applied. In Fig. 1 the lock H is shown in full lines as being out of engagement with the wings D. When the lock H is swung or moved to the position shown in Fig. 3, or to the position indicated in dotted lines in Fig. 1, said lock will prevent the opening of the wings.

The body A of the bird shown in the drawings is mounted upon a back or cover, F, having a joint or hinge, G. When the extensible portion is closed and locked, the cover F can be closed, as shown in Fig. 3, thus protecting the device from injury.

What I claim as new, and desire to secure by Letters Patent, is—

1. An advertising device consisting of the body in the form of a bird having the wings at opposite sides each composed of a series of sections to fold and unfold, and the several sections of each wing having spaces to receive advertisements or the like, substantially as described.

2. An advertising device consisting of the body in the form of a bird having the wings at opposite sides each composed of a series of sections to fold and unfold, and locks H, for holding the wings folded, the several sections of each wing having spaces to receive advertisements or the like, substantially as shown and described.

3. An advertising device consisting of the folding cover F, having the joint G, and the body A in the form of a bird mounted on the cover, and having the wings D at opposite sides, each composed of a series of sections to fold and unfold, and the several sections of each wing having spaces for advertisements or the like, substantially as shown and described.

In testimony whereof I have hereunto set my hand and seal in the presence of two subscribing witnesses.

THOMAS CLARK. [L. S.]

Witnesses:
    WM. C. HAUFF,
    E. F. KASTENHUBER.